(No Model.)
B. MOZER.
CULINARY APPLIANCE.
No. 557,313. Patented Mar. 31, 1896.
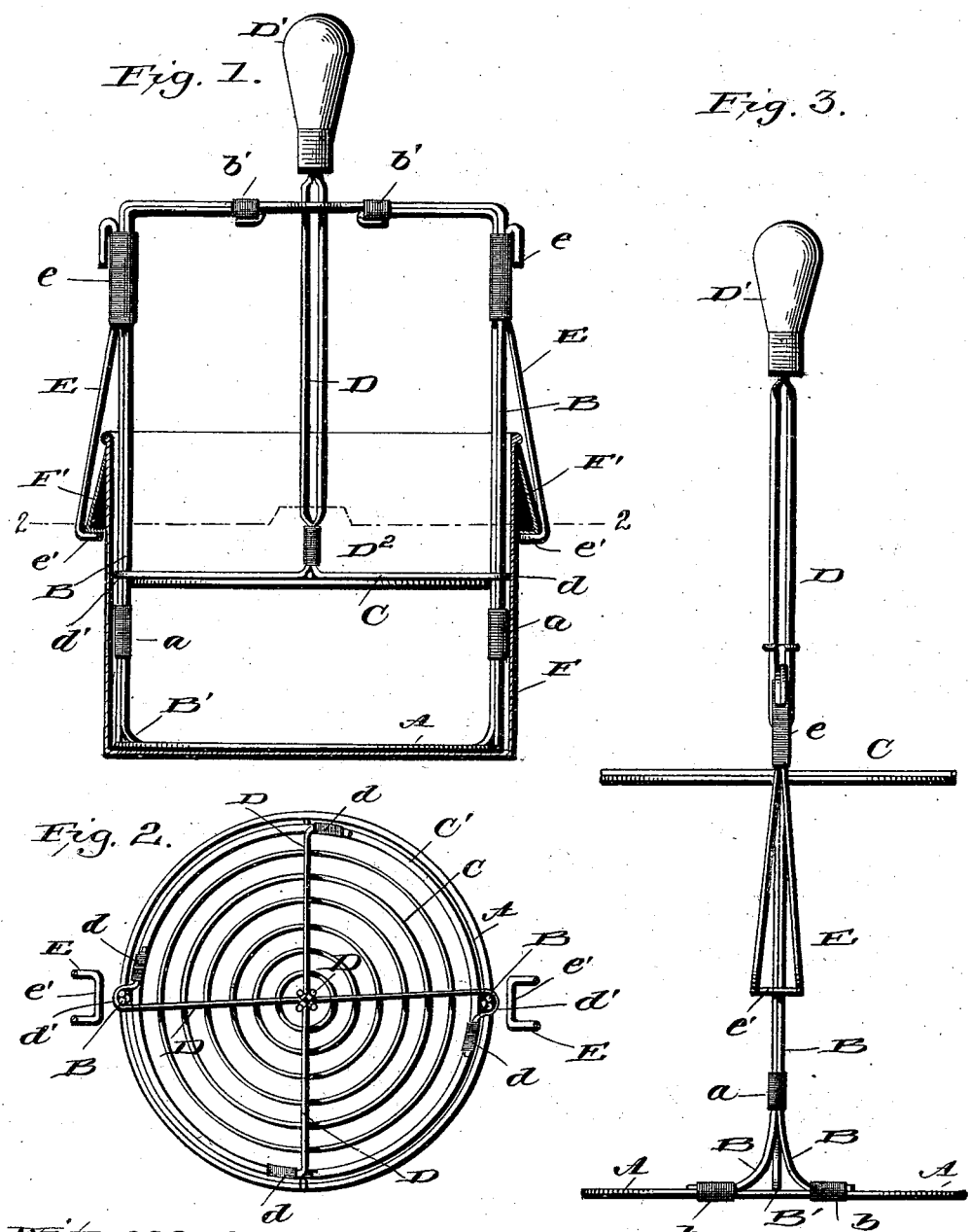
Witnesses:
L. C. Hills
E. H. Bond
Inventor,
Bernhard Mozer
By E. B. Stocking
Atty.

UNITED STATES PATENT OFFICE.

BERNHARD MOZER, OF ALLENTOWN, PENNSYLVANIA.

CULINARY APPLIANCE.

SPECIFICATION forming part of Letters Patent No. 557,313, dated March 31, 1896.

Application filed May 14, 1895. Serial No. 549,316. (No model.)

*To all whom it may concern:*

Be it known that I, BERNHARD MOZER, a citizen of the United States, residing at Allentown, in the county of Lehigh, State of Pennsylvania, have invented certain new and useful Improvements in Culinary Appliances, of which the following is a specification, reference being had therein to the accompanying drawings.

This invention relates to certain new and useful improvements in devices designed for utilization in frying doughnuts, crullers, oysters, and the like, for home or general consumption, of that class in which provision is made for holding the articles to be cooked or fried, so as to prevent their rising on the fat; and it has for its objects, among others, to provide a simple and cheap device of this character by which the cakes or other articles may be quickly and easily placed within the appliance or utensil, so as to be browned on both sides without turning, avoiding the necessity of puncturing the cakes with a fork or other instrument and thus producing a cake or doughnut that will be thoroughly fried or cooked evenly throughout, the fat being prevented from running into it and thus spoiling the taste thereof. A stop or stops are provided for the purpose of preventing the upper sieve or reticulated holder from being pressed down too far and injuring the shape of the cake. Spring rods or wires are provided upon opposite sides of the device to engage under ears or projections on the pail or other receptacle containing the lard in which the articles are fried to hold the same thereto and permit of the easy and ready operation of the movable sieve.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation of my improved culinary appliance shown in position within the pail or other receptacle for containing the lard, which pail or other receptacle is shown in vertical section. Fig. 2 is a horizontal section on the line 2 2 of Fig. 1, looking down. Fig. 3 is an elevation at right angles to that of Fig. 1 of the appliance removed from its receptacle.

Like letters of reference indicate like parts throughout the several views.

Referring now to the details of the drawings by letter, A designates the lower or bottom sieve or frame, which is carried by the frame B, composed of wires, preferably three in number, as shown in Fig. 2, the ends of the outer two of which are secured, as at $b$, to the outer portion or ring of the said bottom sieve, as seen in Fig. 3. The third wire of the frame is extended across the bottom of the lower frame or sieve A and the ends are connected to the upper cross-bar of the frame, as seen at $b'$, the said cross-bar being provided with a passage-way for the handle of the upper or movable sieve. This upper sieve C comprises a ring $C'$, to which are secured, as at $d$, (see Fig. 2,) the ends of the four wires D, which extend from the edge of the ring toward the center thereof and thence upward and are secured in a suitable handle $D'$ in any suitable manner. The horizontal portions of the wires D may be secured to the rings of the sieve in any suitable manner. The ends of two opposite horizontal portions of the wires D are formed with a curve or loop $d'$, as seen in Figs. 1 and 2, to embrace the vertical side portions B of the frame, as shown, so as to be guided by the same in its vertical movements.

The wires of the frame may be bound together, as shown at $a$, and the four wires D may be bound together in proximity to the upper sieve, as seen at $D^2$, to provide greater rigidity, if necessary. Any suitable means may be employed for thus binding the wires together. The means $a$ employed for holding the wires D together also form a stop against which the loops $d'$ of the upper or movable sieve engage to limit the downward movement of the upper sieve, and thus prevent injury to the cakes, whereby their shape is not injured.

With the parts constructed and arranged substantially as above described the operation is as follows: The cake or other article to be fried or cooked is placed upon the lower sieve or frame A, and then the upper sieve is moved downward until the loops thereof strike the stops a, and the device is then placed in the hot fat. The cake or other article is confined between the sieves A and C and held completely immersed in the fat, and both sides will be browned alike.

Of course more than one cake or oyster, or whatever it may be desired to cook, may be placed upon the lower sieve, which may be made of a size and a material best fitted to the use to which it is to be put.

When the cakes are thoroughly fried, the whole device, with the cakes, is lifted from the pan and the fat allowed to drain through the lower sieve.

The rods D are of springy material and are designed to frictionally engage with the inner walls of the loop or opening in the upper cross-bar of the frame, so as to lock the sieve in any desired position with sufficient force to prevent its being upwardly displaced by the raising of the dough or from any other cause or tendency to press upward.

In order to enable the operator to hold the device within the pan, pail, or other receptacle and avoid any tendency of the same to work itself upward or be forced up by the boiling fat, I have the side bars of the frame provided with spring wires or rods E, the upper ends of which are secured to the said side bars in any suitable manner, as at e, and their lower ends bent inward, as seen at e', to engage beneath lugs or ears F' on the pail or receptacle F, as clearly shown in Fig. 1. When the device is placed within the receptacle, the wires or rods E being inclined outwardly and downwardly from their upper ends ride over the inclined faces of the lugs or ears F' on the pail and spring in beneath the same, as will be readily understood.

The device may be removed from the pail by a slight rotary movement thereof with relation to the pail, so as to remove the horizontal portions or catches e' of the wires E from beneath the under faces of the lugs or ears on the pail, and of course it will be readily understood that when it is not desired to hold the device down the same is inserted into the pail with the wires E otherwise than in a plane with or coincident with the said ears or lugs on the pail.

Modifications in detail may be resorted to without departing from the spirit of the invention or sacrificing any of its advantages.

What I claim as new is—

1. A device for the purpose described comprising a support or sieve and a sieve or support slidingly mounted upon and movable with relation thereto vertically, substantially as described.

2. A device for the purpose described, comprising a support or sieve, a sieve or support slidingly mounted upon and movable with relation thereto vertically, and means for limiting the movement of the latter, substantially as described.

3. A device for the purpose described, comprising a frame with a sieve, a sieve slidingly mounted upon said frame and having a handle with spring-rods for holding the same in the desired position, substantially as described.

4. A device for the purpose described, comprising a frame with a sieve, a sieve slidingly mounted upon said frame and having a handle with spring-rods for holding the same in the desired position, and a stop for limiting the movement of the movable sieve, substantially as described.

5. A device of the character described, comprising a frame with a sieve, and a sieve slidingly mounted thereon for movement vertically and provided with spring holding devices, substantially as described.

6. The combination with a receptacle having ears, of a cake-frying device comprising a frame, a sieve slidingly mounted thereon for movement vertically and spring-rods constructed and arranged to coöperate with said ears to hold the device within the receptacle, substantially as described.

7. The combination with the frame carrying a sieve, of a sieve slidingly mounted thereon and having a handle of spring-rods two of which are looped around the vertical portion of the frame and guide the sieve, said rods passing through an opening in the upper cross-bar of the frame and frictionally held therein, substantially as described.

8. The combination with the frame carrying a sieve, of a sieve slidingly mounted thereon and having a handle of spring-rods two of which are looped around the vertical portion of the frame and guide the sieve said rods passing through an opening in the upper cross-bar of the frame and frictionally held therein, and spring holding devices mounted upon the vertical portions of said frame, substantially as described.

In testimony whereof I affix my signature in presence of two witnesses.

BERNHARD MOZER.

Witnesses:
   CHARLES R. JAMES,
   EDWARD H. RENINGER.